(12) United States Patent
Chand et al.

(10) Patent No.: US 7,388,491 B2
(45) Date of Patent: Jun. 17, 2008

(54) MOBILE RFID READER WITH INTEGRATED LOCATION AWARENESS FOR MATERIAL TRACKING AND MANAGEMENT

(75) Inventors: Sujeet Chand, Brookfield, WI (US); Vivek R. Bapat, Pittsburgh, PA (US); Kenwood H. Hall, Hudson, OH (US); Richard A. Morse, Hudson, OH (US); Joseph P. Owen, Jr., Elm Grove, WI (US); Arthur P. Pietrzyk, Thompson, OH (US); Andreas Somogyi, Sagamore Hills, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 294 days.

(21) Appl. No.: 11/185,121

(22) Filed: Jul. 20, 2005

(65) Prior Publication Data

US 2007/0018820 A1 Jan. 25, 2007

(51) Int. Cl.
G08B 13/14 (2006.01)
G06F 17/00 (2006.01)
(52) U.S. Cl. .................... 340/572.1; 335/375
(58) Field of Classification Search .............. None
See application file for complete search history.

(56) References Cited

U.S. PATENT DOCUMENTS

| | | |
|---|---|---|
| 3,858,212 A | 12/1974 | Tompkins et al. |
| 4,949,299 A | 8/1990 | Pickett et al. |
| 5,621,199 A | 4/1997 | Calari et al. |
| 5,629,981 A | 5/1997 | Nerlikar |
| 5,703,347 A | 12/1997 | Reddersen et al. |
| 5,785,181 A | 7/1998 | Quartararo, Jr. |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,964,656 A | 10/1999 | Lawler, Jr. et al. |
| 5,973,600 A | 10/1999 | Mosher, Jr. |
| 6,049,745 A | 4/2000 | Douglas et al. |

(Continued)

FOREIGN PATENT DOCUMENTS

DE 10314260 A1 10/2004

(Continued)

OTHER PUBLICATIONS

International Search Report dated May 17, 2006 for International Patent Application Serial No. PCT/EP2005/007878, 8 pages.

(Continued)

*Primary Examiner*—Julie Bichngoc Lieu
(74) *Attorney, Agent, or Firm*—Amin Turocy & Calvin LLP; R. Scott Speroff

(57) ABSTRACT

A portable RFID reader (or reader/writer) that also employs a location determination subsystem that facilitates determination of the reader (or reader/writer) location. The location subsystem can employ a satellite-based GPS (Global Positioning System) location technology where such signals are unimpeded by structures. Additionally, the location subsystem can employ other terrestrial location technologies that operate inside structures such as warehouses and the factory automation environment.

33 Claims, 11 Drawing Sheets

U.S. PATENT DOCUMENTS

| | | | |
|---|---|---|---|
| 6,091,998 A | 7/2000 | Vasko et al. | |
| 6,116,505 A | 9/2000 | Withrow | |
| 6,121,878 A | 9/2000 | Brady et al. | |
| 6,144,301 A | 11/2000 | Frieden | |
| 6,150,948 A | 11/2000 | Watkins | |
| 6,154,790 A | 11/2000 | Pruett et al. | |
| 6,169,483 B1 | 1/2001 | Ghaffari et al. | |
| 6,170,059 B1 | 1/2001 | Pruett et al. | |
| 6,172,609 B1 | 1/2001 | Lu et al. | |
| 6,205,362 B1 | 3/2001 | Eidson | |
| 6,263,440 B1 | 7/2001 | Pruett et al. | |
| 6,264,106 B1 | 7/2001 | Bridgelall | |
| 6,265,976 B1 | 7/2001 | Roesner et al. | |
| 6,272,321 B1 | 8/2001 | Bruhnke et al. | |
| 6,275,681 B1 | 8/2001 | Vega et al. | |
| 6,282,407 B1 | 8/2001 | Vega et al. | |
| 6,285,295 B1 | 9/2001 | Casden | |
| 6,286,762 B1 | 9/2001 | Reynolds et al. | |
| 6,286,763 B1 | 9/2001 | Reynolds et al. | |
| 6,293,467 B1 | 9/2001 | Reddersen et al. | |
| 6,307,517 B1 | 10/2001 | Lee | |
| 6,317,027 B1 | 11/2001 | Watkins | |
| 6,318,636 B1 | 11/2001 | Reynolds et al. | |
| 6,342,839 B1 | 1/2002 | Curkendall et al. | |
| 6,354,493 B1 | 3/2002 | Mon | |
| 6,362,738 B1 | 3/2002 | Vega | |
| 6,366,206 B1 | 4/2002 | Ishikawa et al. | |
| 6,377,176 B1 | 4/2002 | Lee | |
| 6,377,203 B1 | 4/2002 | Doany | |
| 6,392,544 B1 | 5/2002 | Collins et al. | |
| 6,400,272 B1 | 6/2002 | Holtzman | |
| 6,401,936 B1 | 6/2002 | Isaacs | |
| 6,409,401 B1 | 6/2002 | Petteruti et al. | |
| 6,415,978 B1 | 7/2002 | McAllister | |
| 6,429,776 B1 | 8/2002 | Alicot et al. | |
| 6,445,297 B1 | 9/2002 | Nicholson | |
| 6,445,969 B1 | 9/2002 | Kenney | |
| 6,448,886 B2 | 9/2002 | Garber et al. | |
| 6,451,154 B1 | 9/2002 | Grabau | |
| 6,476,708 B1 | 11/2002 | Johnson | |
| 6,484,886 B1 | 11/2002 | Isaacs | |
| 6,486,780 B1 | 11/2002 | Garber | |
| 6,501,382 B1 | 12/2002 | Rehfus | |
| 6,505,780 B1 | 1/2003 | Yassin et al. | |
| 6,517,000 B1 | 2/2003 | McAllister et al. | |
| 6,523,752 B2 | 2/2003 | Nishitani et al. | |
| 6,529,880 B1 | 3/2003 | McKeen et al. | |
| 6,547,040 B2 | 4/2003 | Goodwin, III | |
| 6,554,187 B2 | 4/2003 | Otto | |
| 6,563,425 B2 | 5/2003 | Nicholson et al. | |
| 6,566,997 B1 | 5/2003 | Bradin | |
| 6,585,165 B1 | 7/2003 | Kuroda | |
| 6,593,853 B1 | 7/2003 | Barrett et al. | |
| 6,600,418 B2 | 7/2003 | Francis et al. | |
| 6,607,123 B1 | 8/2003 | Jollifee et al. | |
| 6,608,551 B1 | 8/2003 | Anderson et al. | |
| 6,608,561 B2 | 8/2003 | Lawler, Jr. et al. | |
| 6,612,495 B2 | 9/2003 | Reddersen et al. | |
| 6,617,962 B1 | 9/2003 | Horwitz et al. | |
| 6,621,417 B2 | 9/2003 | Duncan et al. | |
| 6,622,567 B1 | 9/2003 | Hamel et al. | |
| 6,641,042 B1 | 11/2003 | Pierenkemper et al. | |
| 6,650,227 B1 | 11/2003 | Bradin | |
| 6,664,897 B2 | 12/2003 | Pape et al. | |
| 6,669,089 B2 | 12/2003 | Cybulski et al. | |
| 6,672,512 B2 | 1/2004 | Bridgelall | |
| 6,677,852 B1 | 1/2004 | Landt | |
| 6,687,293 B1 | 2/2004 | Loyer et al. | |
| 6,693,539 B2 | 2/2004 | Bowers et al. | |
| 6,700,931 B1 | 3/2004 | Lee et al. | |
| 6,707,376 B1 | 3/2004 | Patterson et al. | |
| 6,712,276 B1 | 3/2004 | Abali et al. | |
| 6,714,121 B1 | 3/2004 | Moore | |
| 6,724,308 B2 | 4/2004 | Nicholson | |
| 6,726,099 B2 | 4/2004 | Becker et al. | |
| 6,745,008 B1 | 6/2004 | Carrender et al. | |
| 6,747,560 B2 | 6/2004 | Stevens, III | |
| 6,750,769 B1 | 6/2004 | Smith | |
| 6,752,277 B1 | 6/2004 | Sempliner | |
| 6,784,789 B2 | 8/2004 | Eroglu et al. | |
| 6,784,813 B2 | 8/2004 | Shanks et al. | |
| 6,791,603 B2 | 9/2004 | Lazo et al. | |
| 6,793,127 B2 | 9/2004 | Alsafadi et al. | |
| 6,802,659 B2 | 10/2004 | Cremon et al. | |
| 6,808,116 B1 | 10/2004 | Eslambolchi | |
| 6,809,646 B1 | 10/2004 | Lee | |
| 6,812,838 B1 | 11/2004 | Maloney | |
| 6,828,902 B2 | 12/2004 | Casden | |
| 6,842,106 B2 | 1/2005 | Hughes et al. | |
| 6,847,856 B1 | 1/2005 | Bohannon | |
| 6,853,294 B1 | 2/2005 | Ramamurthy et al. | |
| 6,853,303 B2 | 2/2005 | Chen et al. | |
| 6,870,797 B2 | 3/2005 | Reasoner et al. | |
| 6,873,260 B2 | 3/2005 | Lancos et al. | |
| 6,879,809 B1 | 4/2005 | Vega et al. | |
| 6,888,459 B2 | 5/2005 | Stilp | |
| 6,899,476 B1 | 5/2005 | Barrus et al. | |
| 6,901,304 B2 | 5/2005 | Swan et al. | |
| 6,903,656 B1 | 6/2005 | Lee | |
| 6,917,291 B2 | 7/2005 | Allen | |
| 6,918,541 B2 | 7/2005 | Knowles et al. | |
| 6,929,412 B1 | 8/2005 | Barrus et al. | |
| 6,940,408 B2 | 9/2005 | Ferguson et al. | |
| 6,943,688 B2 | 9/2005 | Chung et al. | |
| 7,057,509 B2 | 6/2006 | Gualdi et al. | |
| 7,066,388 B2 | 6/2006 | He | |
| 7,073,712 B2 | 7/2006 | Jusas et al. | |
| 7,079,023 B2 | 7/2006 | Haller | |
| 7,183,922 B2 | 2/2007 | Mendolia et al. | |
| 7,187,288 B2 | 3/2007 | Mendolia et al. | |
| 7,195,159 B2 | 3/2007 | Sloan et al. | |
| 2001/0000019 A1 | 3/2001 | Bowers et al. | |
| 2001/0008390 A1 | 7/2001 | Berquist | |
| 2002/0005774 A1 | 1/2002 | Rudolph | |
| 2002/0130778 A1 | 9/2002 | Nicholson | |
| 2002/0143320 A1 | 10/2002 | Levin | |
| 2002/0165758 A1 | 11/2002 | Hind et al. | |
| 2002/0167397 A1 | 11/2002 | Eroglu et al. | |
| 2002/0185532 A1 | 12/2002 | Berquist et al. | |
| 2003/0023337 A1 | 1/2003 | Godfrey et al. | |
| 2003/0102367 A1 | 6/2003 | Monette et al. | |
| 2003/0169149 A1 | 9/2003 | Ohki et al. | |
| 2004/0024644 A1 | 2/2004 | Gui et al. | |
| 2004/0032443 A1 | 2/2004 | Moylan | |
| 2004/0061324 A1 | 4/2004 | Howard | |
| 2004/0062294 A1 | 4/2004 | Clemens et al. | |
| 2004/0066281 A1 | 4/2004 | Hughes et al. | |
| 2004/0069851 A1 | 4/2004 | Grimes | |
| 2004/0095910 A1 | 5/2004 | Metts et al. | |
| 2004/0108378 A1 | 6/2004 | Gatz | |
| 2004/0124988 A1 | 7/2004 | Leonard et al. | |
| 2004/0189443 A1 | 9/2004 | Eastburn | |
| 2004/0220860 A1 | 11/2004 | Persky et al. | |
| 2005/0012613 A1 | 1/2005 | Eckstein et al. | |
| 2005/0021369 A1* | 1/2005 | Cohen et al. ................. 705/2 |
| 2005/0035849 A1 | 2/2005 | Yizhack | |
| 2005/0040934 A1 | 2/2005 | Shanton | |
| 2005/0052283 A1 | 3/2005 | Collins et al. | |
| 2005/0058483 A1 | 3/2005 | Chapman et al. | |
| 2005/0083180 A1 | 4/2005 | Horwitz | |
| 2005/0088299 A1 | 4/2005 | Bundy et al. | |
| 2005/0092825 A1 | 5/2005 | Cox et al. | |
| 2005/0093678 A1 | 5/2005 | Forster et al. | |
| 2005/0110641 A1 | 5/2005 | Mendolla et al. | |

| | | |
|---|---|---|
| 2005/0140511 A1 | 6/2005 | Bonnell et al. |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0179521 A1 | 8/2005 | Pillai et al. |
| 2005/0180566 A1 | 8/2005 | Ryal |
| 2005/0190098 A1 | 9/2005 | Bridgelall et al. |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0258955 A1 | 11/2005 | Gloekler et al. |
| 2005/0269407 A1 | 12/2005 | Hannon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0071774 A1 | 4/2006 | Brown et al. |
| 2006/0145850 A1 | 7/2006 | Krstulich |
| 2006/0208859 A1 | 9/2006 | Hougen et al. |
| 2007/0008073 A1 | 1/2007 | Poasevara |
| 2007/0013519 A1 | 1/2007 | Chung et al. |
| 2007/0040681 A1 | 2/2007 | Jessup |
| 2007/0159311 A1* | 7/2007 | Schober ............... 340/435 |
| 2007/0205860 A1* | 9/2007 | Jones et al. ............. 340/5.61 |
| 2007/0205861 A1* | 9/2007 | Nair et al. ............. 340/5.61 |

FOREIGN PATENT DOCUMENTS

| | | |
|---|---|---|
| EP | 1542105 A | 6/2005 |
| WO | 0016289 | 3/2000 |
| WO | 0058752 | 10/2000 |
| WO | 0169516 | 9/2001 |
| WO | 02073523 | 9/2002 |
| WO | 03056403 A | 7/2003 |
| WO | 03056469 A | 7/2003 |
| WO | 2005045743 A | 5/2005 |

OTHER PUBLICATIONS

Partial International Search Report dated Mar. 30, 2006, for PCT Application Serial No. PCT/EP2005/007878, 3 pages.

European Search Report dated Feb. 6, 2006 mailed Feb. 20, 2006 for European Patent Application Serial No. 10/985,173, 3 Pages.

M. Karkkainen, et al.: "The product centric approach: a solution to supply network information management problems?" Computers in Industry, Elsevier Science Publishers. Amsterdam, NL, vol. 52, No. 2, Oct. 2003.

European Search Report dated Feb. 14, 2006 mailed Feb. 20, 2006 for European Patent Application Serial No. 10/985,621, 3 Pages.

* cited by examiner

MOBILE RFID READER WITH INTEGRATED LOCATION AWARENESS FOR MATERIAL TRACKING AND MANAGEMENT

TECHNICAL FIELD

This invention is related to RFID (Radio Frequency Identification) technology, and more specifically, to RFID readers that sense RFID tags.

BACKGROUND OF THE INVENTION

In today's highly sophisticated, complex and intelligent industrial automation systems, RFID (Radio Frequency Identification) technology is becoming an increasingly important presence for logistics concerns, material handling and inventory management. Simply knowing that an object exists in a large warehouse is no longer sufficient. When implementing an RFID solution in a distribution center or a factory, it is customary to utilize three distinct platforms: an RFID reader/antenna (e.g., a fixed implementation), RFID "middleware" software running on a standard PC (Personal Computer), and an industrial controller (e.g., a PLC-Programmable Logic Controller). A traditional communications approach is to have the RFID reader connect to the controller via a network using, for example, RS-232 serial communications, Ethernet, or any of the field buses such as DeviceNet, ControlNet, etc.

The value to a company in knowing the location of the reader can be used to improve manufacturing and distribution efficiency, which translates to a more effective competitive presence in the marketplace. In conventional RFID implementations, the physical location of the RFID reader is usually provided by the human operator, or readers are fixed at known locations such that RFID-tagged material that passes within range of the reader can be read and its location determined based on the location of the reader. However, given the rapid technological advances in portable handheld communications devices (e.g., cell phones and PDAs), customers are demanding such portability in RFID readers.

When a mobile RFID reader is utilized for reading RFID tags on objects in a distribution center or a factory, a computer that captures the data from such a reader is utilized to relate the data to the known reader location for determining the approximate location of the tagged object. However, the small and portable RFID reader can now be a mobile handheld device, and also mounted on forklift trucks, AGVs (Automated Guided Vehicles) and/or LGVs (Laser Guided Vehicles), and other mobile means in a warehouse or a factory further exacerbating the difficulty in determining the reader location at a given point in time. Accordingly, there is an unmet need in the art for an improved mobile reader location determination mechanism.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a portable or mobile RFID reader (or RFID reader/writer) that also employs a location determination subsystem that facilitates determination of the reader (or reader/writer) location, from which then the location of an object or pallet can be determined for material flow and tracking. The location subsystem can employ a satellite-based GPS (Global Positioning System) location technology where such signals are unimpeded by structures, etc. Additionally, the location subsystem can employ other terrestrial location technologies that operate inside structures such as warehouses and the factory automation environment.

In another aspect of the invention, data provided by the mobile reader can be used in combination with data of a PLC (programmable logic controller) to more accurately determine location for material flow and tracking.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

FIG; 6 illustrates a system that includes triangulation and/or signal strength system for location determination in accordance with the invention.

Figure 7:
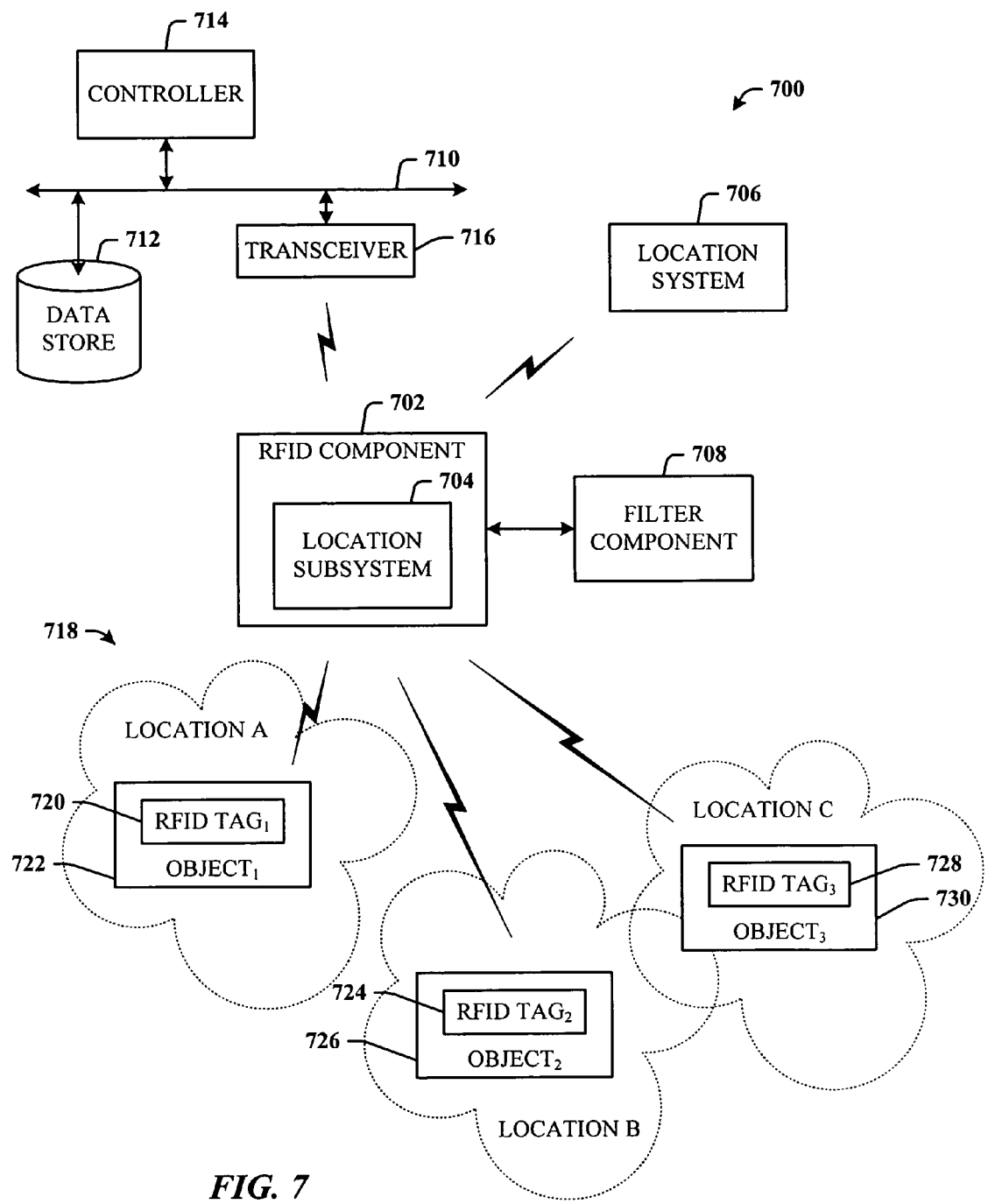

FIG. 7 illustrates a system that employs filtering in accordance with the invention.

Figure 8:
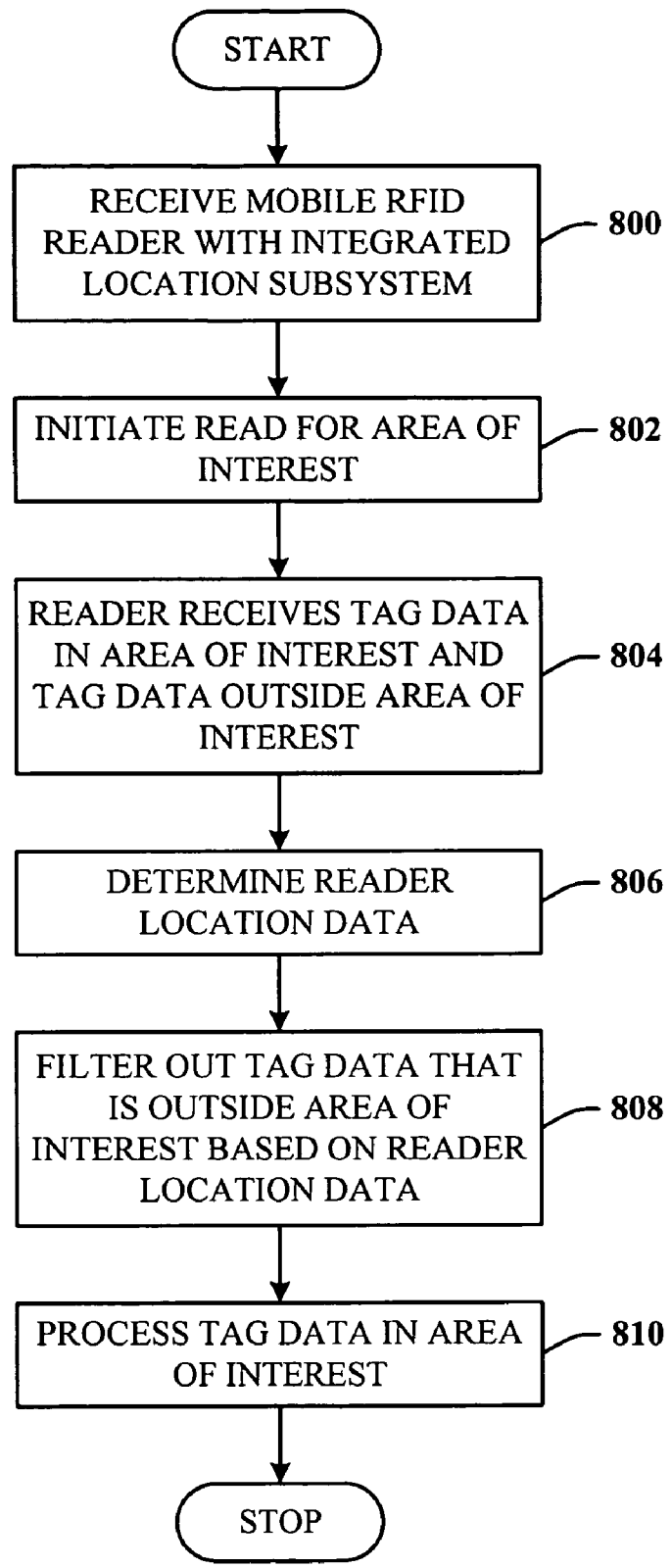

FIG. 8 illustrates a methodology of filtering RFID tag data based on location of interest in accordance with the invention.

Figure 9:
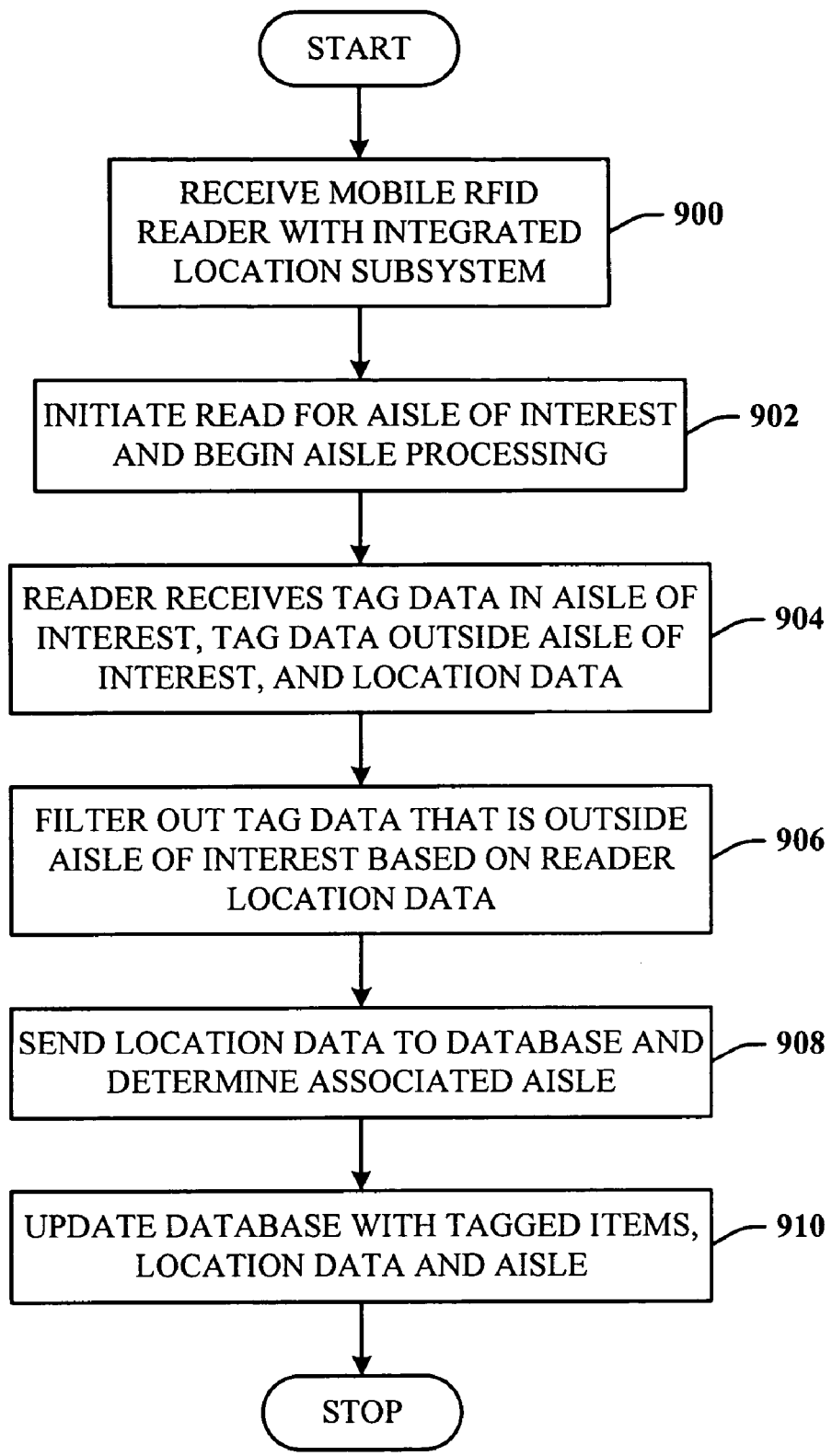

FIG. 9 illustrates a methodology of filtering RFID tag data based on an aisle of interest, in accordance with the invention.

Figure 10:
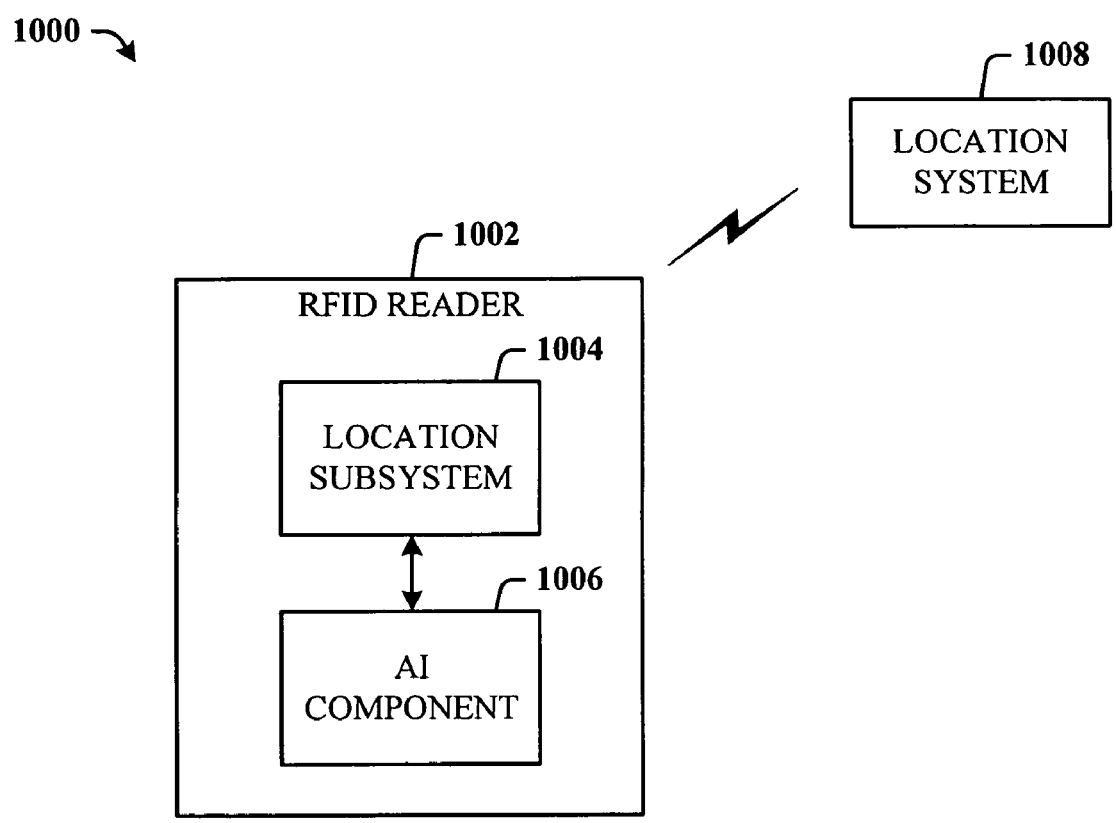

FIG. 10 illustrates a system that employs artificial intelligence (AI) which facilitates automating one or more features in accordance with the subject invention.

Figure 11:
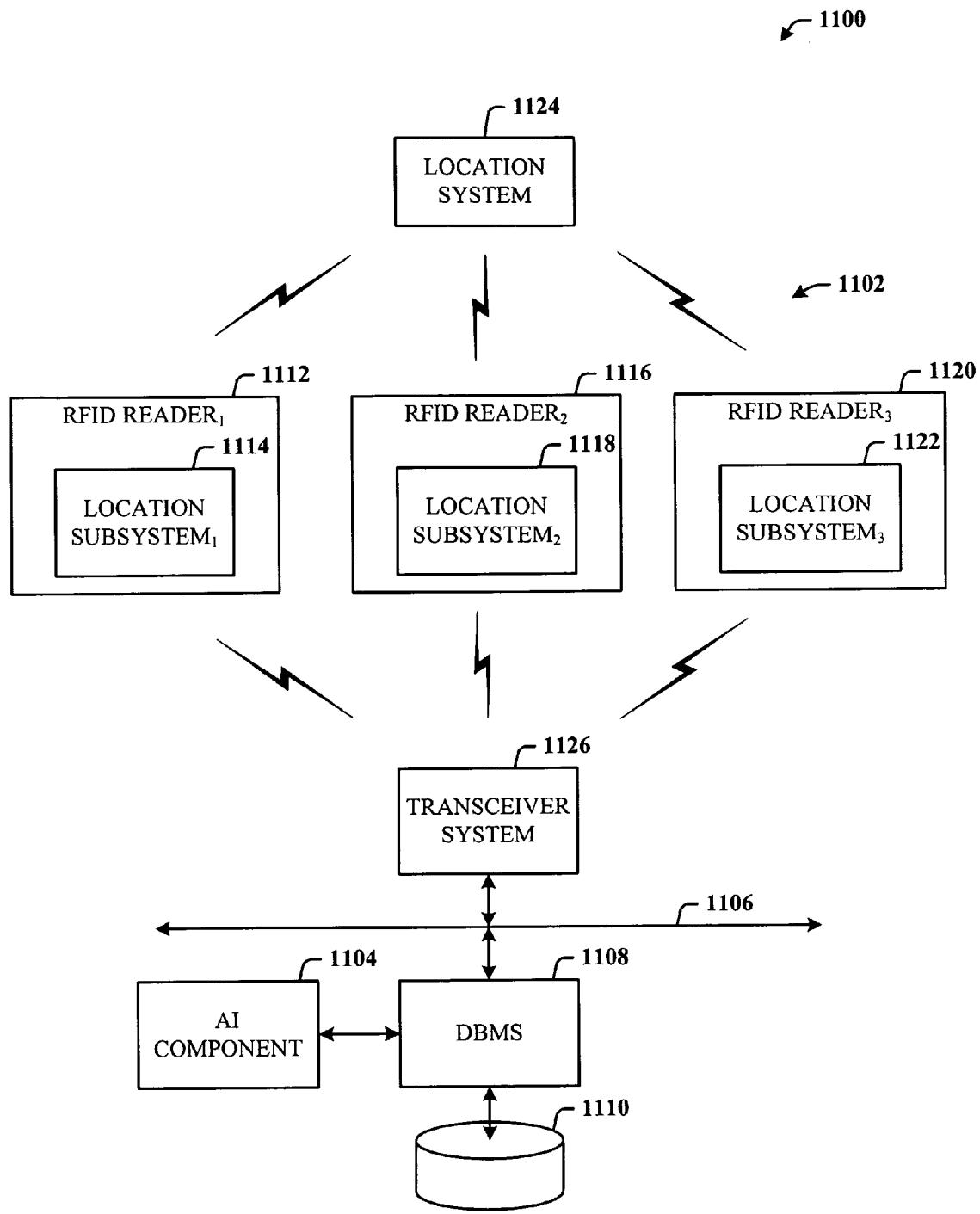

FIG. 11 illustrates a system that employs multiple readers and an AI component in accordance with the subject invention.

Figure 12:
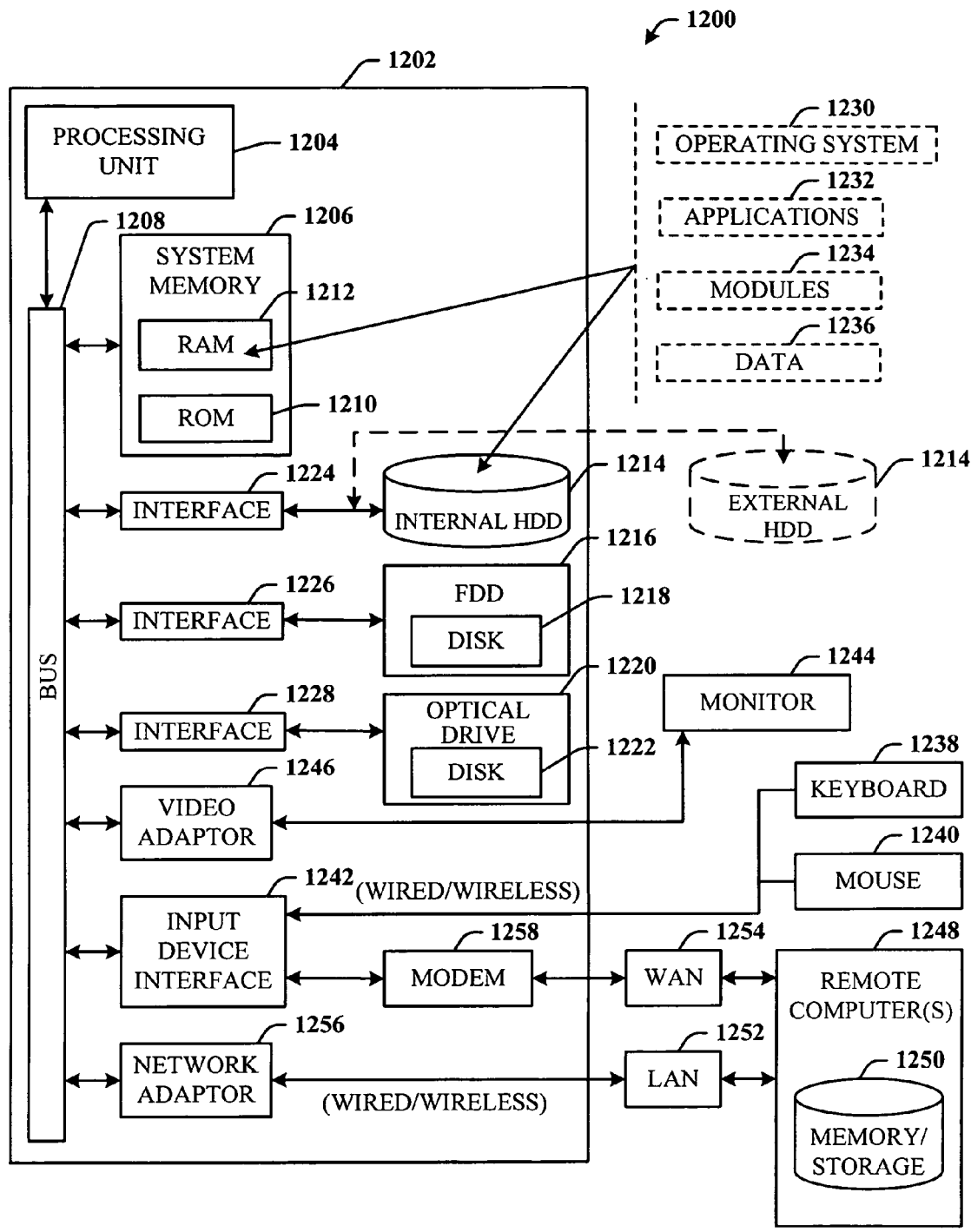

FIG. 12 illustrates a block diagram of a computer operable to execute the disclosed architecture.

Figure 13:
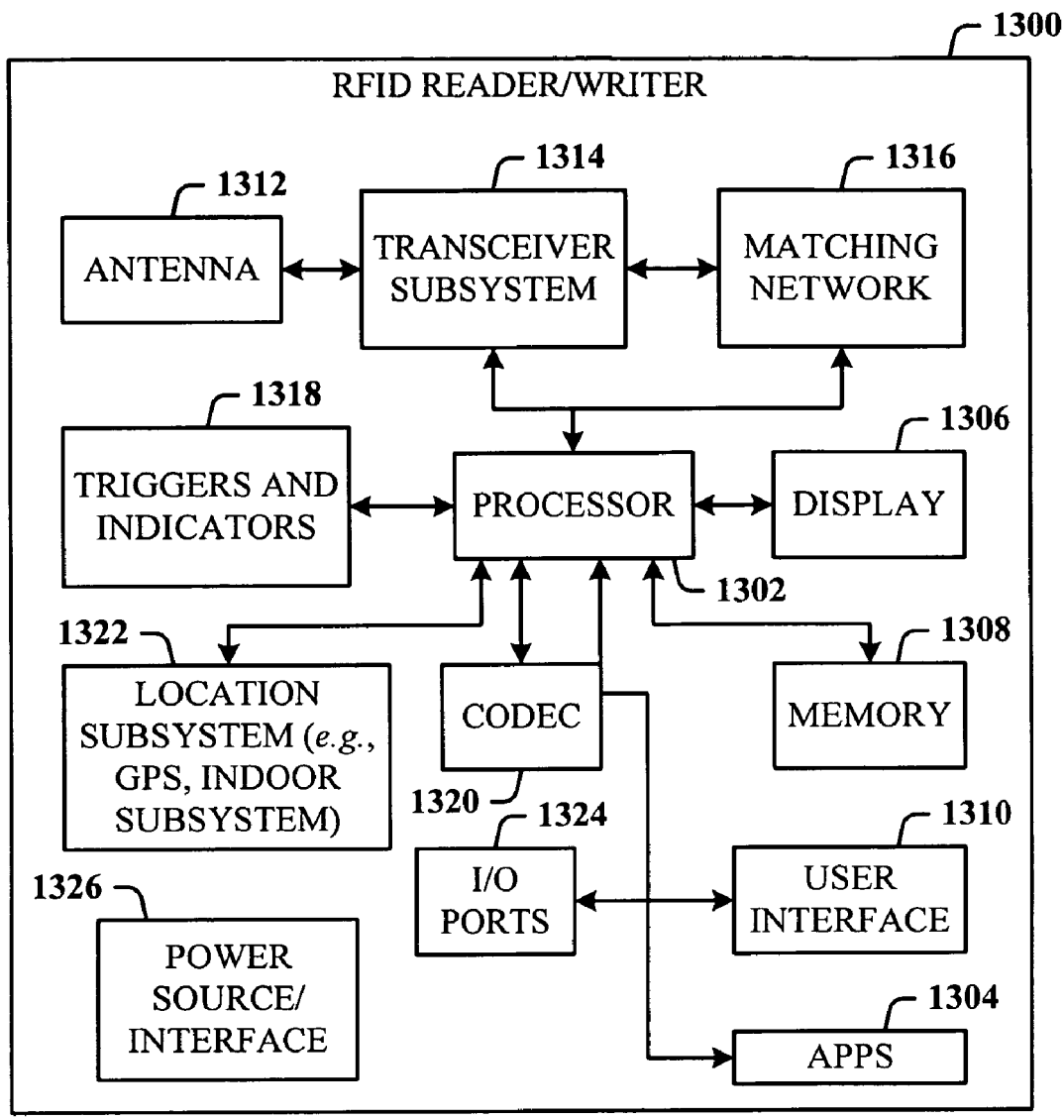

FIG. 13 illustrates a block diagram of an RFID reader/writer in accordance with the subject invention.

DETAILED DESCRIPTION OF THE INVENTION

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
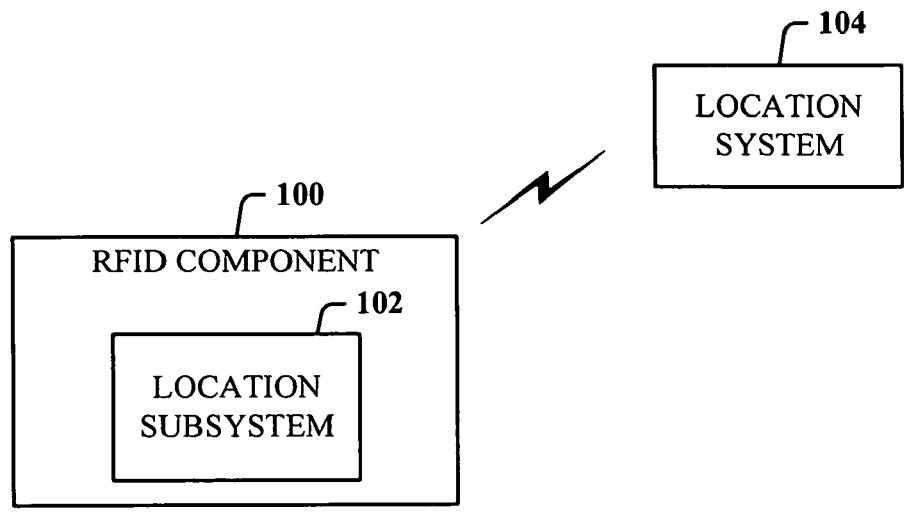
FIG. 1 illustrates an RFID component that employs a location subsystem that facilitates location determination in accordance with the subject invention.

Referring initially to the drawings, FIG. 1 illustrates an RFID component 100 that employs a location subsystem 102 that facilitates location determination in accordance with the subject invention. The RFID component 100 can be an mobile RFID reader (or a reader/writer) that reads RFID tags (or reads data from and writes data thereto) of an object (e.g., a pallet). The RFID component 100 includes a location subsystem 102 that facilitates processing location information received in cooperation with a remote location system 104. In one implementation, the location system 104 is a satellite-based GPS (global positioning system) technology. For example, when the component 100 performs a read of an RFID tag, it also initiates a read of location data from the location system 104 via the location subsystem 102. The RFID reader can then transmit the location coordinates with the RFID data on every read. Thereafter, the RFID tag data and the location data are transmitted for processing, to a programmable logic controller (PLC), for example. Automated material tracking software can then store the location information with the object identifier in a database for material flow and tracking, for example.

Location awareness can be embedded in the RFID reader through multiple means. One method is to connect the reader to a conventional, wireless Wi-Fi network utilizing a IEEE 802.11b protocol. In such a network, schemes exist for localizing a node utilizing signal strengths or triangulation. There are also other methods for location determination such as WhereNet™, which is utilized in automotive applications. Essentially, any type location determination method can be integrated or designed with the RFID reader to provide location awareness.

Location awareness also facilitates filtering the data read by the RFID reader, since a controller and/or a database can exist that can further relate the physical location to the type of objects and associated tags. A location-aware mobile RFID reader has numerous applications such as automatic scanning of warehouse shelves and cataloging the products on the shelves, automatic scanning of a distribution center and updating of inventory by location, automatic scanning of retail shelves to update inventory, etc.

In another implementation, the location subsystem 102 and RFID component 100 are fabricated as an ASIC (application-specific integrated circuit). This further reduces the size of a mobile reader, for example, thereby promoting placement of the reader not only in the hands of users, but also on machines that move through a warehouse, or up and down aisles.

The RFID component 100 can also write the location data to the RFID tag such that the tag stores historical data as to where the associated object has been in the warehouse or during the assembly process, for example.

Figure 2:
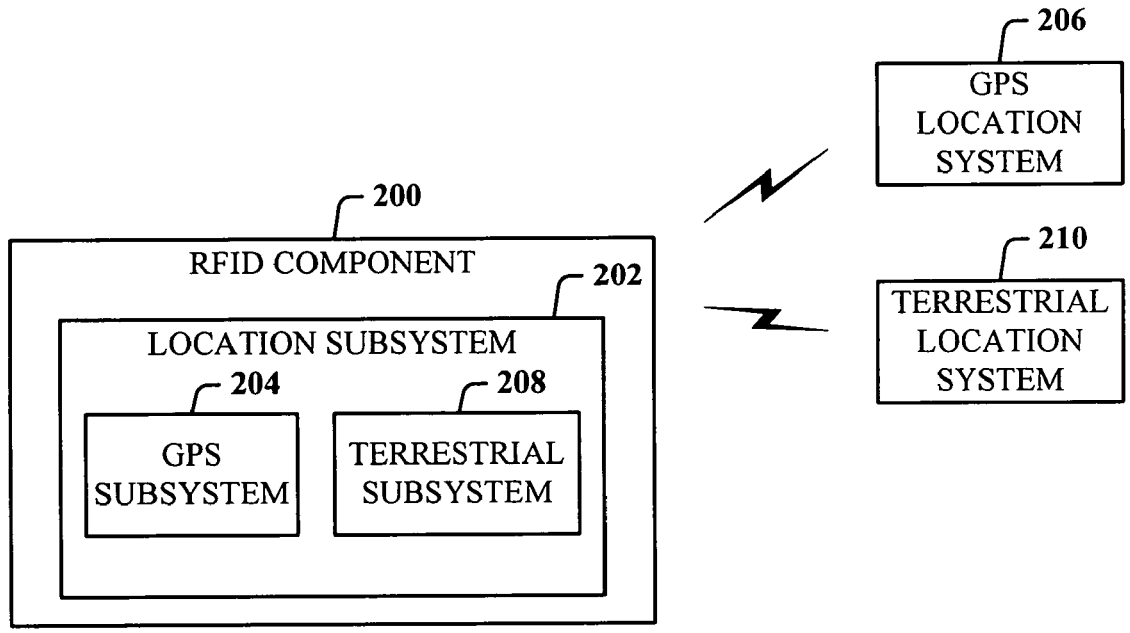
FIG. 2 illustrates an RFID component that employs a multiple types of location subsystems that facilitate location determination in accordance with the subject invention.

FIG. 2 illustrates an RFID component 200 that employs a multiple types of location subsystems that facilitate location determination in accordance with the subject invention. The RFID component 200 can be an mobile RFID reader or reader/writer that reads RFID tags. The RFID component 200 includes a location subsystem 202 for location determination. Here, the location subsystem 202 includes a GPS subsystem 204 that accommodates GPS signals from a GPS (or outdoor) location system 206, and terrestrial subsystem 208 that facilitates processing indoor location information received in cooperation with a remote indoor terrestrial location system 210.

When the component 200 senses an RFID tag, it also initiates a read of location data from the either or both of the GPS location system 206 or/and the terrestrial location system 210. The RFID reader can then transmit the location coordinates with the RFID data on every read or every other read, or according to some other methodology, as desired. Thereafter, the RFID data and the location data are transmitted for processing. For example, automated material tracking software can then store the location information with the object identifier in a database for material flow and tracking.

When employing both location subsystems (204 and 208) in the RFID component 200, one or both subsystems can be employed. For example, if the user were to walk among tagged objects outside a warehouse, the GPS subsystem will operate to communicate GPS location coordinates (latitude/longitude or "lat/long" data) with the tag data. It is to be appreciated that the terrestrial system 210 is a triangulation system or signal strength system that is also deployed for outside RFID object tracking such that the terrestrial subsystem 208 operates to determine location information in a format that is different than GPS coordinates, and that is also transmitted with the RFID tag data.

Figure 3:
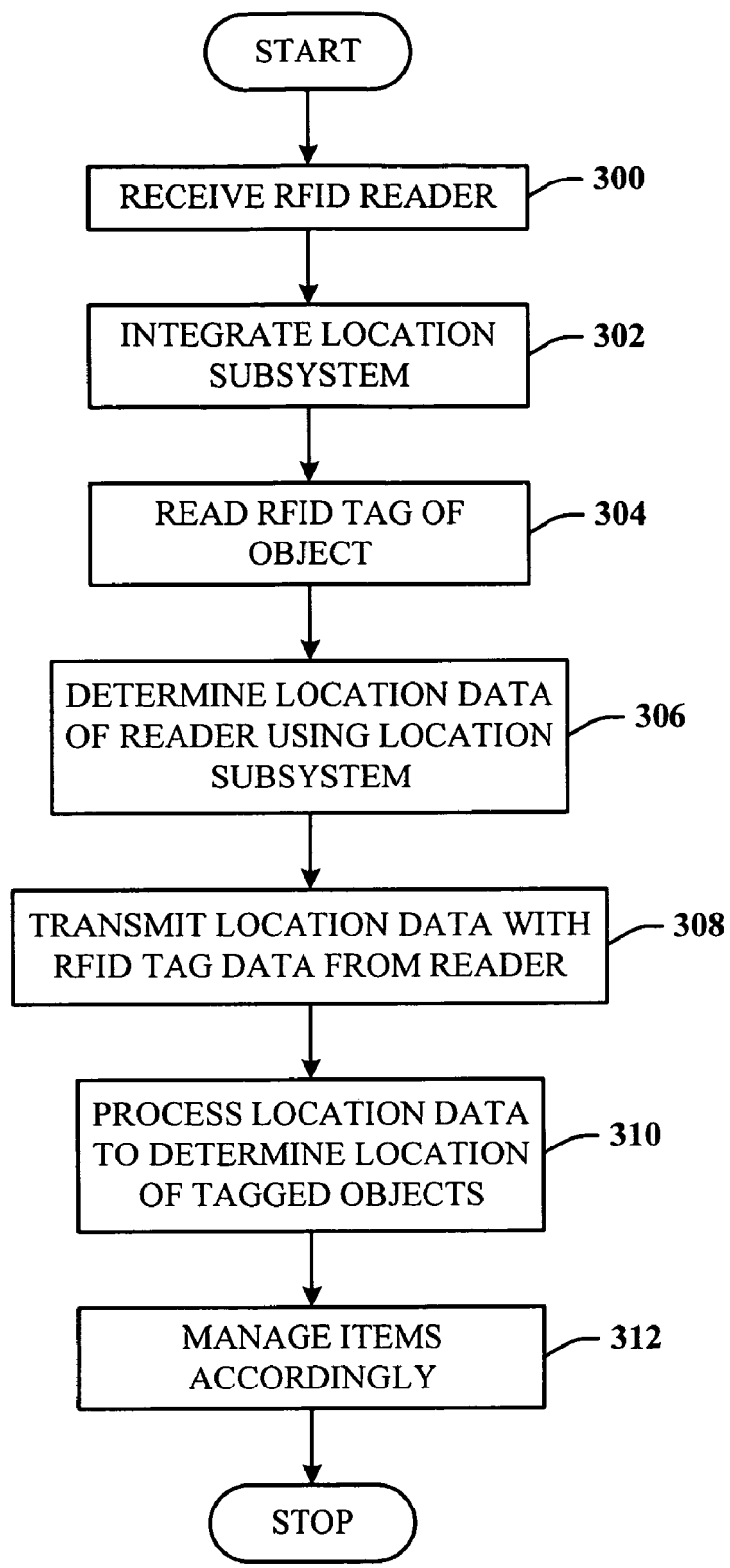
FIG. 3 illustrates a methodology of employing a location subsystem in an RFID reader in accordance with the invention.

FIG. 3 illustrates a methodology of employing a location subsystem in an RFID reader in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 300 an RFID reader is received. At 302, a location subsystem is integrated into the reader. At 304, the reader reads an RFID tag of an object. At 306, location data related to the location of the reader is determined using the location subsystem. At 308, the location data is transmitted for the reader with the RFID data. At 310, the location data is processed to determine the location of the tagged objects. At 312, the objects are then managed, which can include updating a database or inventory records as to the current location of the associated objects (e.g., products and pallets).

Figure 4:
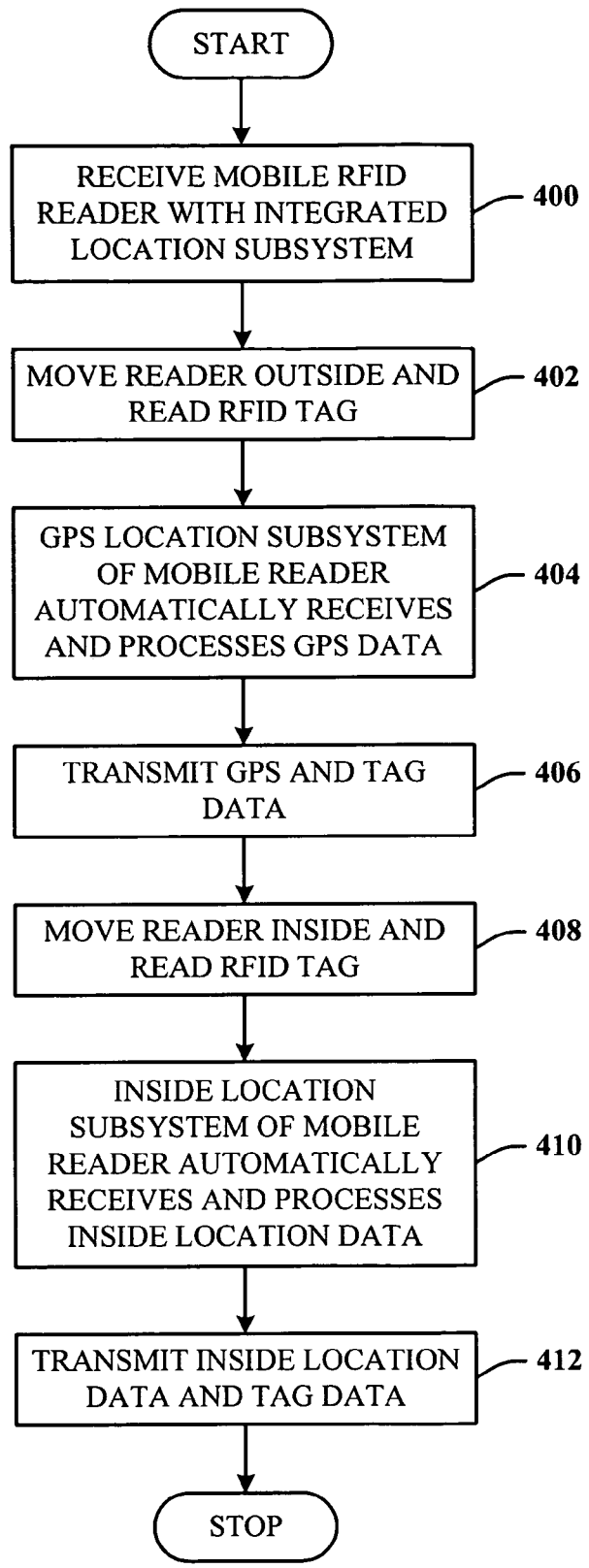
FIG. 4 illustrates a methodology of utilizing both GPS and an internal location subsystem as location mechanisms in accordance with the invention.

FIG. 4 illustrates a methodology of utilizing both GPS and an internal location subsystems as location mechanisms in accordance with the invention. At 400, a mobile RFID reader is received with an integrated location subsystem that can process GPS signals and inside (also referred to as the terrestrial location system) location signals. At 402, the reader is moved outside in view of a satellite-based GPS geographic location system. At 404, the GPS subsystem of the mobile reader automatically receives and processes the GPS signals. At 406, the GPS lat/long data and the RFID tag data are transmitted to a remote location for processing. At 408, the user carries the reader inside a structure thereby prohibiting the use of the GPS location system and reads an RFID tag of an object. At 410, the inside location subsystem of the mobile reader is enabled to automatically receive and process location information. The handoff between the GPS location subsystem and the inside location subsystem can occur based on the GPS subsystem not receiving GPS signals. If no GPS signals are received, the reader automatically defaults to the inside location subsystem for location data. At 412, the reader then transmits the location data and the RFID data for processing.

In one alternative implementation, the location data associated with the terrestrial location subsystem is determined by the remote terrestrial location system, and not by the mobile reader. Once the tag is read, a trigger signal can be sent that automatically passes the associated location data to a data base for association with the tag data. Alternatively, again, the tag data is transmitted to the remote terrestrial location system and associated there for subsequent transmission to a database.

Figure 5:
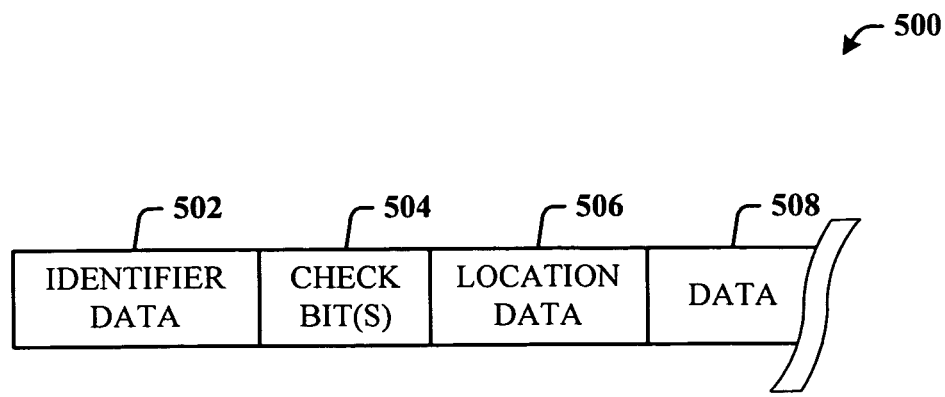
FIG. 5 illustrates a data packet that includes location data in accordance with the invention.

FIG. 5 illustrates a data packet 500 that includes location data in accordance with the invention. The packet 500 includes a packet identifier 502 that uniquely identifiers that packets among a plurality of the other data packets. For example, the identifier can be associated with the mobile reader such that only packets transmitted therefrom have the identifier data 502. The packet 500 can also include some check bits 504 that are used for error correction (e.g., cyclic redundancy check-CRC). Location data 506 is included that represents the approximate location of the reader when the read operation was performed. The packet 500 can also include tag data 508 of the RFID tag that was read. This can comprise environmental data (e.g., temperature, humidity, pressure, . . . ) received from one or more sensors and object data of the product to which the tag is associated, for example.

Figure 6:
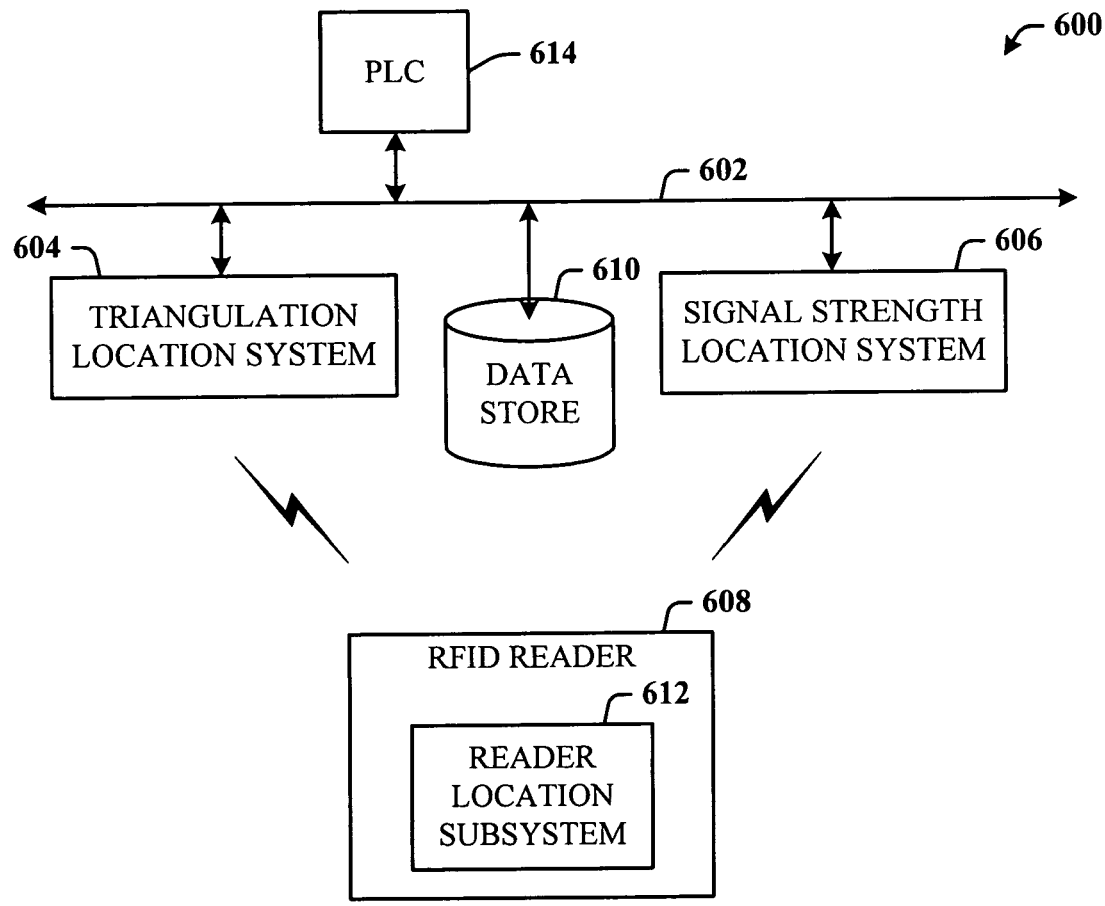

Referring now to FIG. 6, there is illustrated a system 600 that includes triangulation and/or signal strength system for location determination in accordance with the invention. The system 600 includes a network 602 on which is disposed a triangulation location system 604 and/or a signal strength location system 606. The triangulation system 604 can further include at least two wireless transceivers (not shown) that receive reader signals from an RFID reader 608, process the reader signals having the same identifier data, and determine an approximate location of the reader 608 relative to a floor plan of a building (e.g., warehouse, distribution center, . . . ). The location data can then be communicated back to the reader 608 for processing by a reader location subsystem 612 and transmission with the tag data to a data store 610. The location data can also be transmitted from the mobile reader to a PLC 614 and therefrom to the data store 610. Alternatively, the location data can be communicated from the triangulation system 604 to the data store 610 and combined with the tag data at the data store 610.

In an alternative location system implementation, the signal strength location system 606 processes signals from the reader 608 to approximate the reader location based on signal strength. The location data can then be communicated back to the reader 608 for processing by the reader location subsystem 612 and transmission with the tag data to a data store 610.

FIG. 7 illustrates a system 700 that employs filtering in accordance with the invention. When a reader 702 reads RFID tags, a read signal is broadcast from the reader 702 that energizes and/or causes to be received RFID tag data from all tags in a given range thereof. Thus, the reader 702 can receive data from a large number of tags for which data is not desired. Not only does this impose additional processing requirements on the reader 702, but it can also negatively impact network bandwidth between the reader and a remote system. As a means of addressing this problem, the reader 702 includes a location subsystem 704 that interacts with a remote location system 706 (e.g., GPS, triangulation, signal strength, . . . ) to provide location data representative of the location of the reader 702, and a filter component 708 that interfaces to the reader 702 and processes the RFID tag data and the location data to filter out tag signals that are unwanted. Note that the filter component 708 can also be made internal to the reader 702.

The system can also include a network 710 on which is disposed a data store 712 that stores at least tag data, reader data, and location data. A controller 714 (e.g., a PLC) can also be disposed on the network 710 in control of an automated process such as moving product down an assembly line. A transceiver 716 provides wireless network communications between the network 710 and the reader 702 such that location data and tag data can be communicated to the data store 712 and/or the controller 714.

Illustrated are objects 718 (denoted OBJECT$_1$, OBJECT$_2$, and OBJECT$_3$) and associated RFID tags (denoted RFID TAG$_1$, RFID TAG$_2$, and RFID TAG$_3$) in respective locations (LOCATION A, LOCATION B, AND LOCATION C). The user desires to read a tag 720 of a first object 722 in Location A, yet receives in addition thereto data from a second tag 724 of a second object 726 in Location B and a third tag 728 of a third object 730 in a Location C. The location system 706 facilitates determination of location data of the reader 702 such that in this example, the user is determined to be closer to Location A.

It can already be known from prior tag scans and/or user input information, for example, that the first object 722 is associated with Location A, the second object 726 is associated with Location B, and the third object 730 is associated with Location C. Accordingly, any other tag data received by the reader 702 indicating that the tag (724 and 728) is associated with an object that is not in Location A can be filtered without further processing. Similarly, as the user moves the mobile reader that contains the RFID component 702 closer to Location B, the tag data that is received from object tags in Location A and Location C can be filtered out from further consideration.

FIG. 8 illustrates a methodology of filtering RFID tag data based on location of interest in accordance with the invention. At 800, a mobile RFID reader is provided with an internal location subsystem. At 802, the user initiates a read of RFID tags at a first area of interest. At 804, the reader receives tag data in the area of interest and tag data from outside the area of interest. At 806, the reader location data is determined using the internal location subsystem. At 808, tag data from the outside areas of interest is filtered out based on location data. At 810, tag data is processed from the area of interest.

FIG. 9 illustrates a methodology of filtering RFID tag data based on an aisle of interest, in accordance with the invention. At 900, the mobile reader and internal location subsystem is provided. At 902, a read operation is initiated at an aisle of a store or warehouse, for example. At 904, the reader receives tag data from tags in the existing aisle of interest, tag data from tags outside the aisle of interest, and location data. At 906, the tag data from outside the aisle of interest is filtered out based on the location data associated with the reader. At 908, the location data is transmitted to a database to determine the associated aisle. At 910, the database is updated with tagged items, location data, and aisle data.

It is noted that the location information of the mobile reader need not be the sole means by which material flow and tracking can be determined. For example, the mobile RFD reader can transmit information to the PLC, which PLC then uses its information in combination with the reader data to determine material location. If, for example, the PLC interfaces to a bar code scanner (a fixed device at a known location), it is then known where the material is (e.g., a pallet), when the bar code is scanned. Additionally, when the mobile RFID reader subsequently transmits data about the pallet which it read, and its location to the PLC (relative to there mobile reader, since it just read one or more tags), the PLC can then confirm that this is the same pallet it processed just previously. This helps validate the location of the pallet or object.

A pallet (or material), for example, typically follows a sequential movement or known path through a distribution center. Additionally, a PLC is fixed, as is a bar code reader that interface to the PLC. Thus, if the mobile RFID reader reads the material, and transmits the reader location to the PLC (e.g., "the pallet was read in Zone 22), the PLC can precisely know which pallet it is, and know exactly where it is in Zone 22 based on the information the PLC had from a bar code read, etc. The PLC can have additional information about location of the pallet or object based on prior reads. This information can be combined with the location information provided by the reader with its own internal knowledge of the location to better determine exactly where the pallet or object is, or can initiate diagnostics that indicates this is the wrong pallet or object.

FIG. 10 illustrates a system 1000 that employs artificial intelligence (AI) which facilitates automating one or more features in accordance with the subject invention. Here, an RFID reader 1002 includes a location subsystem 1004 and an AI component 1006. The location subsystem 1004 interacts with a remote location system 1008 that together, facilitate determination of location data of the reader 1002.

The subject invention can employ various AI-based schemes for carrying out various aspects thereof. For example, a process for determining what tag data is consider to outside an area of interest can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria what RFID tagged objects are or should be associated with a given location. For example, if over a period of time, the mobile reader 1002 routinely senses an object type in a certain area, the AI component 1006 will learn that, unless otherwise instructed, the object type will be expected to be in that area during read operations in the future.

In another example, where a given user is assigned to scan certain areas on routine basis, the AI component 1006 can learn that the user will routinely take a certain route to scanning the area, and operate accordingly by, for example, cause the caching of object and/or tag data (e.g., at the reader 1002 and/or a remote database) in preparation for updating and/or interacting with data normally associated with the area.

In yet another example, when the RFID component 1002 reads an RFID tag, instead of automatically transmitting location data and the tag data right away, the AI component 1006 can facilitate storing sets of location and tag data locally in memory, and then transmitting sets or blocks of the location and tag data when desired. This block transmission can be according to parameters related to network usage, time of day, location of read, importance of the objects needing to be located, and many other parameters as desired for the particular application.

FIG. 11 illustrates a system 1100 that employs multiple readers 1102 and an AI component 1104 in accordance with the subject invention. The AI component 1004 can be located external to the reader 1002, such as part of a network 1106 that includes a remote database system 1108 (e.g., a database management system (DBMS) and an associated data store 1110). The AI component 1104 can interface to the database system 1108 as an external component or be an internal component thereof. The database system 1108 stores at least location data, tag data, and object data for all objects of a location.

In this example implementation, a first mobile reader 1112 (denoted RFID READER$_1$) includes a first location subsystem 1114 (denoted LOCATION SUBSYSTEM$_1$), a second mobile reader 1116 (denoted RFID READER$_2$) includes a second location subsystem 1118 (denoted LOCATION SUBSYSTEM$_2$), and a third mobile reader 1120 (denoted RFID READER$_3$) includes a third location subsystem 1122 (denoted LOCATION SUBSYSTEM$_3$), each of which can communicate with a remote location system 1124 that facilitates determining location data of the readers (1112, 1116 and 1120) using GPS and/or a indoor location technology, for example. Note that the remote location system 1124 can also be disposed as a node on the network 1106.

Each of the readers (1112, 1116 and 1120) also communicates wirelessly with the network 1106 and any network services via a transceiver system 1126 such that reader data can be downloaded to the database system 1108 and uploaded therefrom, as desired. The database system 1108 can include material tracking software and other applications related to material handling and logistics, for example.

When multiple readers (e.g., 1112, 1116 and 1120) are employed and communicating data and signals to the network 1106, the AI component 1104 can be utilized to monitor packet traffic and manage data caching in memory of the database system 1108 according to, for example, the most active readers at a given time. The AI component 1104 can also be employed to compute location parameters associated with one or more of the readers (1112, 1116 and 1120) based on criteria described supra. For example, in an implementation where a reader is mobile by way of a machine, each of the readers (1112, 1116 and 1120) can be configured separately over aisles of tagged objects such that as the reader moves down an overhead rail system (e.g., in a warehouse). Here, linear movement of the reader down the rail can occur under control of the AI component 1104 at a speed based on, for example, the processing capability of the database system 1108, the reader itself, and network traffic.

In another example, data handling and processing of the system 1100 can be based on the importance of scanning certain objects. If the database system 1108 has tagged certain types of objects as high priority, then when the reader (e.g., reader 1112) enters the location of the objects, or where the objects are expected to be, the location data can be employed as a trigger that reading thereof now takes a higher priority over other objects whose tag data may also be received.

Referring now to FIG. 12, there is illustrated a block diagram of a computer operable to execute the disclosed AI component 1104 and dataset system 1108 of the subject invention. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary computing environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 13 illustrates a block diagram of an RFID reader/writer device 1300 in accordance with the subject invention. The device 1300 includes a processor 1302 that manages all onboard processes and executes instructions of one or more applications 1304 that facilitate RFID tag reading and writing, location data processing, and any data and signal processing required for operation thereof. A display 1306 is provided that allows a user to view data and information, and input commands or instructions for operation of the device 1300. A memory 1308 is provided for data storage, program storage, and execution, and can include volatile and/or non-volatile memory architectures (e.g., RAM, DRAM, ROM, EEPROM, and flash). A user interface block 1310 provides electrical, mechanical and software interface capabilities such as keypad, voice activation via a microphone, touch screen, trackball, mouse, and pen inputs, for example, for user interaction with the device 1300.

The device 1300 includes RF capabilities supported by an antenna 1312, a transceiver subsystem 1314 for transmitting and receiving data and signals in one of or both an analog and digital format, and as data packets. The transceiver subsystem 1314 interfaces to a matching network block 1316 that provides the circuits and logic in support of RF communications to both active and passive RFID transponders, and digital communications therebetween, and to IP networks, for example. A triggers and indicators block 1318 provides and supports indicators and outputs such as audio devices and signals (e.g., speaker, beeps, tones), visual devices and signals (e.g., LED's, colors) and other types of outputs. Additionally, triggers can be provided to the processor 1302 based on internal hardware and/or software events that occur in the device 1300. A CODEC 1320 interfaces to the processor 1302 to facilitate coding and decoding operations on data and signals, where needed.

A location subsystem 1322 facilitates location determination of the device 1300 in accordance with the invention, anywhere inside a building or structure, as well as outside using GPS, for example. An I/O ports block 1324 provided hardware interfaces to the device 1300 such as by USB (universal serial bus) technology, IEEE 1394 technology, or other conventional communications technologies (e.g., infrared, BlueTooth, Wi-Fi, Wi-Max, . . . ). A power source/interface block 1326 facilitates standalone power (e.g., batteries and/or fuel cells) or external power to the device 1300 and all onboard components and subsystems via a power converter, for example.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio frequency identification (RFID) system, comprising:
   an RFID component that senses an RFID tag associated with an object;
   a location component integral to the RFID component that facilitates determination of a location of the RFID component; and
   a programmable logic controller (PLC) that receives RFID component location data and RFID tag data, and processes the RFID component location data and the RFID tag data in combination with data of PLC to facilitate the location of the tagged object.

2. The system of claim 1, wherein the location component utilizes at least one of triangulation technology and signal strength technology to determine the location of the RFID component.

3. The system of claim 1, wherein the location component utilizes GPS (global positioning system) technology to determine the location of the RFID component.

4. The system of claim 1, wherein the location component generates location data that is transmitted from the reader with RFID data.

5. The system of claim 1, wherein location data associated with the location is used for object flow and tracking.

6. The system of claim 1, wherein the RFID component is one of a mobile reader and a mobile reader/writer.

7. The system of claim 6, wherein the mobile reader is one of a handheld portable reader and a mechanically motivated reader.

8. The system of claim 1, wherein PLC data includes bar code data.

9. The system of claim 1, further comprising an artificial intelligence (AI) component that employs a probabilistic and/or statistical-based analysis to prognose or infer an action that a user desires to be automatically performed.

10. A computer-readable medium having stored thereon computer-executable instructions that facilitates carrying out sensing, location determination, and data processing of the RFID component, location component, and PLC, respectively, of the system of claim 1.

11. A handheld portable RFID reader that employs the system of claim 1.

12. An RFID system, comprising:
    a mobile RFID reader that reads an RFID tag associated with an object;
    a location component as part of the RFID reader that facilitates determination of location data of a location of the mobile RFID reader; and
    a programmable logic controller (PLC) that receives RFID reader location data and RFID tag data and processes the RFID reader location data and the RFID tag data in combination with data of PLC to facilitate the location of the tagged object.

13. The system of claim 12, wherein the location component utilizes at least one of triangulation technology and signal strength technology to determine the location data of the RFID reader.

14. The system of claim 12, wherein the location component interfaces with a remote GPS technology to determine the GPS location data of the RFID reader, which GPS location data is transmitted from the RFID reader with RFID tag data.

15. The system of claim 12, wherein the location component includes both a GPS location subsystem that receives and processes GPS location data and an inside location subsystem that interfaces to remote location system which operates inside a building or a structure, where GPS signals are impeded by the building or the structure.

16. The system of claim 12, further comprising a filter component that filters received RFID tag data according to the location data.

17. The system of claim 16, wherein the location data resides in at least one of a database and the RFID reader.

18. The system of claim 12, further comprising an artificial intelligence (AI) component as part of the RFID reader that employs a probabilistic and/or statistical-based analysis to prognose or infer an action that a user desires to be automatically performed.

19. The system of claim 12, wherein the RFID reader interfaces to a remote database system that employs an AI component facilitates probabilistic and/or statistical-based analysis to prognose or infer an action that a user desires to be automatically performed.

20. The system of claim 12, wherein the location data is also representative of material location, and which location data is processed with bar code data to determine a more accurate material location.

21. A method of determining location of a portable RFID reader, comprising:
   receiving a portable reading device that performs at least one of reading from and writing to an RFID tag of an object;
   providing a location subsystem as part of the portable reading device that communicates with an external location system to determine location data that represents the location of the portable reading device and an RFID tag read by the portable reading device;
   transmitting the location data of the portable reading device and RFID tag data to a PLC; and
   processing the location data of the portable reading device and RFID tag data in combination with data of PLC to determine the location of the tagged object.

22. The method of claim 21, further comprising acts of:
   receiving the location data into the location subsystem; and
   transmitting the location data to a remote location for storage in response to reading the RFID tag.

23. The method of claim 21, further comprising acts of:
   receiving the location data into the location subsystem; and
   transmitting the location data and tag data to a remote location for storage as sets of data at a time other than when the RFID tag is read.

24. The method of claim 21, further comprising an act of writing the location data to the RFID tag in response to reading the RFID tag.

25. The method of claim 21, further comprising an act of automatically switching from a first location mode of the location subsystem to a second location mode of the location subsystem when the first location mode is inoperative.

26. The method of claim 25, wherein the first location mode processes GPS data and the second location mode processes indoor location information.

27. The method of claim 26, wherein the indoor location information is derived from one of a triangulation technology and a signal strength measurement technology.

28. The method of claim 21, further comprising an act of automatically caching data related to objects associated the location data.

29. The method of claim 21, further comprising acts of:
   automatically transmitting the location data and RFID tag data of the RFID tag to a PLC; and
   processing the location data and PLC data to determine new location data associated with a new location of the RFID tag.

30. A portable RFID reader, comprising:
   means for reading RFID data of an RFID tag;
   means for interfacing to a remote geographic location system;
   means for processing location data received from the remote geographic location system;
   means for transmitting the RFID data and the location data for storage;
   means for transmitting the location data and RFID data of an RFID tag to a PLC; and
   means for processing the location data and RFID data in combination with data of PLC to determine the location of the RFID tag.

31. The reader of claim 30, further comprising means for writing to the RFID tag.

32. The reader of claim 30, wherein the remote geographic location system performs triangulation to generate the location data.

33. The reader of claim 30, wherein the remote geographic location system performs signal strength analysis to generate the location data.

* * * * *